United States Patent
Fu et al.

(10) Patent No.: US 11,290,193 B2
(45) Date of Patent: Mar. 29, 2022

(54) D-DIMENSIONAL CHAIN TELEPORTATION METHOD FOR RANDOM TRANSMISSION BASED ON MEASUREMENT RESULTS OF RELAY NODES

(71) Applicant: SOOCHOW UNIVERSITY, Suzhou (CN)

(72) Inventors: Fenxiang Fu, Suzhou (CN); Min Jiang, Suzhou (CN); Zhixin Xia, Suzhou (CN); Hong Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/296,903

(22) PCT Filed: Jul. 14, 2020

(86) PCT No.: PCT/CN2020/101754
§ 371 (c)(1),
(2) Date: May 25, 2021

(87) PCT Pub. No.: WO2021/008508
PCT Pub. Date: Jan. 21, 2021

(65) Prior Publication Data
US 2022/0045770 A1 Feb. 10, 2022

(30) Foreign Application Priority Data

Jul. 16, 2019 (CN) .......................... 201910641643.7

(51) Int. Cl.
*H04B 10/70* (2013.01)
*H04B 10/29* (2013.01)
*H04B 10/079* (2013.01)

(52) U.S. Cl.
CPC ......... *H04B 10/70* (2013.01); *H04B 10/0795* (2013.01); *H04B 10/29* (2013.01)

(58) Field of Classification Search
None
See application file for complete search history.

(56) References Cited

U.S. PATENT DOCUMENTS

| 7,702,106 B2 * | 4/2010 | Mimih | H04L 9/0858 380/256 |
| 8,155,318 B2 * | 4/2012 | Tsurumaru | H04L 9/0858 380/256 |

(Continued)

FOREIGN PATENT DOCUMENTS

| CN | 109257171 A | 1/2019 |
| CN | 109379183 A | 2/2019 |
| CN | 110350968 A | 10/2019 |

OTHER PUBLICATIONS

Jiang et al. "Faithful teleportation via multi-particle quantum states in a network with many agents" Quantum Inf Process (2012) 11:23-40 (Feb. 2, 2011).

*Primary Examiner* — Jai M Lee
(74) *Attorney, Agent, or Firm* — SZDC Law P.C.

(57) ABSTRACT

The present invention discloses a d-dimensional chain teleportation method for random transmission based on measurement results of relay nodes. The method includes: two communicating parties are an information sender Alice and an information receiver Bob, a particle t carries an unknown quantum state and is held by the information sender Alice, Alice holds the particle t and a particle $A_1$, a first intermediate node Charlie 1 holds a particle $B_1$ and a particle $A_2$, a second intermediate node Charlie 2 holds a particle $B_2$ and a particle $A_3$, . . . , and a $k^{th}$ (k=2, 3, . . . , P) intermediate node Charlie k holds a particle $B_k$ and a particle $A_{k+1}$. The beneficial effect of the present invention is as follows: any (Continued)

relay node can randomly transmit its generalized Bell measurement result to the information sender Alice or the information receiver Bob, thereby greatly reducing connection restrictions of a classical channel.

5 Claims, 3 Drawing Sheets

(56) References Cited

U.S. PATENT DOCUMENTS

| | | | | |
|---|---|---|---|---|
| 9,270,385 | B2* | 2/2016 | Meyers | H04B 10/70 |
| 11,177,876 | B2* | 11/2021 | Jiang | H04B 10/70 |
| 2013/0202314 | A1* | 8/2013 | Ramaldanov | H04B 10/70 |
| | | | | 398/152 |
| 2014/0363174 | A1* | 12/2014 | Azuma | H04L 9/0855 |
| | | | | 398/173 |
| 2020/0244373 | A1* | 7/2020 | Huberman | H04Q 11/0062 |
| 2021/0105135 | A1* | 4/2021 | Figueroa | G01B 9/02017 |
| 2021/0175976 | A1* | 6/2021 | Rahman | H04L 9/0855 |
| 2021/0326119 | A1* | 10/2021 | Brandao | G06F 7/00 |

* cited by examiner

D-DIMENSIONAL CHAIN TELEPORTATION METHOD FOR RANDOM TRANSMISSION BASED ON MEASUREMENT RESULTS OF RELAY NODES

This application is the National Stage Application of PCT/CN2020/101754, filed on Jul. 14, 2020, which claims priority to Chinese Patent Application No. 201910641643.7, filed on Jul. 16, 2019, which is incorporated by reference for all purposes as if fully set forth herein.

FIELD OF THE INVENTION

The present invention relates to the field of quantum transmission, and specifically to a d-dimensional chain teleportation method for random transmission based on measurement results of relay nodes.

DESCRIPTION OF THE RELATED ART

Information security is a crucial element for information transmission. Compared with classical communication, quantum communication is based on the quantum mechanical theory, and two major quantum properties, that is, the quantum uncertainty principle and the quantum no-cloning theorem, are used to ensure the security of information transmission. Therefore, in recent years, the quantum communication technology gradually becomes the main research focus of the quantum theory and informatics all over the world. Quantum communication is the transfer of quantum information or classical information through quantum channels or through both quantum channels and classical channels, including aspects such as quantum teleportation [1-3], quantum dense coding [4], quantum entanglement swapping [5-7], and quantum private communication [8-12].

The quantum teleportation theory was first proposed by the scientists Bennett, Brassard, et al. [13] in 1993, and quantum entanglement properties are used to implement quantum teleportation. A large number of experimental researches have been carried out so far. The basic principle of quantum teleportation is as follows: an information sender (Alice) wants to transfer one unknown quantum state to an information receiver (Bob). Alice and Bob share one EPR entangled pair in advance. A joint Bell basis measurement is implemented on two particles held by Alice. Because of the quantum nonlocal correlations of the EPR pair, at this time, all quantum information in an unknown state is "transferred" to the second particle in the EPR pair, that is, the particle held by Bob. It is only necessary to apply an appropriate unitary transformation to the quantum state of the second particle in the EPR pair according to a Bell basis measurement result transferred through a classical channel. In this way, this particle is in an identical quantum state with an unknown state to be transferred, to implement the reproduction of the unknown quantum state on the second particle in the EPR.

During actual quantum communication, in consideration of the channel loss, it is very difficult to directly perform teleportation between two nodes at a relatively large distance. Therefore, as the research of the quantum communication technology progresses, quantum networking [14-16] is an inevitable development trend. In the quantum network, several relay nodes are introduced, and entanglement swapping [17 and 18] is performed on every two relay nodes, so that a direct entangled channel can be established between two communicating parties that do not directly share quantum entangled pair. With this entangled channel, the communication can be eventually implemented between two remote nodes based on the EPR protocol. In recent years, the research on the quantum teleportation based on network quantum relay nodes has made significant progress. In 2005, Sheng-Tzong Cheng et al. [19] proposed a routing scheme for a hierarchical network structure. The routing scheme is used for transferring information of one quantum state between two nodes that do not directly share the entangled pair. In 2014, Wang Kan et al. [20] proposed a quantum wireless multihop teleportation system based on any Bell pair. The system is used for constructing the quantum communication network. In 2017, Zhen-Zhen Zou et al. [21] proposed a quantum multihop teleportation protocol. The protocol may be used to implement the teleportation of any two qubit states between two nodes that do not directly share the entangled pair. However, in the existing multihop quantum teleportation methods, the Bell measurement results of relay nodes is transmitted to the information receiver for processing. In the actual multihop quantum teleportation systems, no classical channel may be established between relay nodes and the information receiver to transmit information, or it is inconvenient to transmit information because there is the relatively long communication distance between relay nodes and the information receiver. In addition, in most existing multihop quantum teleportation methods, a 2-level case is considered. In practice, a multi-level quantum state [22 and 23] is a very important quantum resource. For the teleportation of one multi-level unknown quantum state, a multi-level quantum teleportation channel needs to be established.

The references are as follows:

[1] Bennett C. H. Brassard G, Crepeau C, et al. Teleporting an Unknown Quantum State via Dual Classical and Einstein-Podolsky-Rosen Channels [J], Phys. Rev. Lett., 1993, 70: 1895-1899

[2] Anders Karlsson, Mohamed Bourennane. Quantum teleportation using three-particle entanglement. Physical Review A: Atomic, Molecular and Optical Physics, Vol. 58, No. 6, 4394-4400 (1998).

[3] YANG C P, GUO G C. Multi-particle generalization of teleportation [J]. Chin Phys Lett, 2000, 17: 162.

[4] Bennett C H and Wiesner S J. Communication via one and two particle operators on Einstein-Podolsky-Rosen states. Phys. Rev. Lett., 1992, 69:2881-2884.

[5] Zukolwski M, Zeilinger A, Horne A et al. Event-ready-detectors Bell experiment via entanglement swapping. Phys. Rev. Lett., 1993, 70(26): 4287-4290.

[6] PAN J W, BOUWMEESTER D, WEINFURTER H, et al. Experimental entanglement swapping: Entangling photons that never interacted [J]. Physical Review Letters, 1998, 80(18):3891-3894.

[7] LU H, GUO G C. Teleportation of two-particle entangled state via entanglement swapping [J]. Phys Lett A, 2000, 276: 209.

[8] Ekert A K. Quantum crytograph based on Bell's theorem [J]. Phys. Rev. Lett., 1991, vol. 67, pp. 661-663.

[9] Hillery M, Buzek V, Berthiaume A. Quantum secret sharing [J]. Phys. Rev. A, 1999, vol. 59, pp. 1829-1934.

[10] Guo G P and Guo G C. Quantum secret sharing without entanglement [J]. Phys. Lett. A, 2003, 310(4):247-251.

[11] Yan F L, Gao T. Quantum secret sharing between multiparty and multiparty without entanglement [J]. Phys. Rev. A. 2005, vol. 72, pp. 012304.

[12] YAN F L, GAO T, Li Y C. Quantum Secret Sharing Protocol between Multiparty and Multiparty with Single Photons and Unitary Transformations [J]. CHIN. PHYS. LETT., 2008, Vol. 25, No. 4 (2008) 1187.

[13] Bennett C. H. Brassard G, Crepeau C, et al. Teleporting an Unknown Quantum State via Dual Classical and Einstein-Podolsky-Rosen Channels [J], Phys. Rev. Lett., 1993, 70: 1895-1899
[14] Xiu-Bo Chen, Yuan Su, Gang Xu, Ying Sun, Yi-Xian Yang. Quantum state secure transmission in network communications[J]. Information Sciences 276 (2014) 363-376.
[15] Zhen-Zhen Li, Gang Xu, Xiu-Bo Chen, Xing-Ming Sun, and Yi-Xian Yang. Multi-User Quantum Wireless Network Communication Based on Multi-Qubit GHZ State [J]. IEEE COMMUNICATIONS LETTERS, VOL. 20, NO. 12, DECEMBER 2016.
[16] Sheng-Tzong Cheng, Chun-Yen Wang, Ming-Hon Tao. Quantum communication for wireless wide-area networks [J], IEEE. Journal on Selected Areas in Communications, 2005, 23(7): 1424-1432.
[17] Luiz Carlos Ryff. Einstein, Podolsky, and Rosen correlations, quantum teleportation, entanglement swapping, and special relativity. Physical Review A: Atomic, Molecular and Optical Physics. Vol. 60, No. 6, 5083-5086 (1999).
[18] Jian Dong; Jian-Fu Teng; Shu-Yan Wang. Controlled Teleportation of Multi-qubit Quantum Information by Entanglement Swapping. Communications in Theoretical Physics. Vol. 51, No. 5, 823-827 (2009).
[19] Sheng-Tzong Cheng, Chun-Yen Wang, Ming-Hon Tao. Quantum communication for wireless wide-area networks [J], IEEE. Journal on Selected Areas in Communications, 2005, 23(7): 1424-1432.
[20] Kan Wang, Xu-Tao Yu, Sheng-Li Lu, Yan-Xiao Gong. Quantum wireless multihop communication based on arbitrary Bell pairs and teleportation. [J]. Physical Review A, 2014, 89(2A): 1-10.
[21] Zhen-Zhen Zou, Xu-Tao Yu, Yan-Xiao Gong, Zai-Chen Zhang. Multihop teleportation of two-qubit state via the composite GHZ-Bell channel. Physics Letters A 381 (2017) 76-81.
[22] Yu-Hong Zheng, Su-Qian Zhao, Zhan-Le Du, Feng-Li Yan. Transmission of Multi-level Multi-particle Quantum State. Journal of Hebei Normal University (Natural Science Edition), Vol. 26 No. 2, March 2002.
[23] CAO Min, ZHU Shi-Qun. Probabilistic Teleportation of Multi-particle d-Level Quantum State [J]. Communications in Theoretical Physics. 2005, Vol. 43 (5): 803-805.

SUMMARY OF THE INVENTION

The technical problem to be resolved by the present invention is to provide a d-dimensional chain teleportation method for random transmission based on measurement results of relay nodes, to resolve the following problems: (1) Two communicating parties in a communication network do not directly share a quantum entangled pair. (2) It is difficult for relay nodes in a communication network to directly transmit Bell measurement results to an information receiver.

To resolve the foregoing technical problem, the present invention provides a d-dimensional chain teleportation method for random transmission based on measurement results of relay nodes of the present invention, where two communicating parties are an information sender Alice and an information receiver Bob, a particle t carries an unknown quantum state and is held by the information sender Alice, Alice holds the particle t and a particle $A_1$, a first intermediate node Charlie 1 holds a particle $B_1$ and a particle $A_2$, a second intermediate node Charlie 2 holds a particle $B_2$ and a particle $A_3$, ..., and a $k^{th}$ ($k=1, 2, 3, \ldots, P$) intermediate node Charlie k holds a particle $B_k$ and a particle $A_{k+1}$, where P is a positive integer, the information receiver Bob at a target node is a $(P+2)^{th}$ node in a multihop quantum teleportation system and holds a particle $B_{P+1}$, every two adjacent nodes share a two-bit Bell state quantum channel, to form a chain communication channel, and entangled channels have the same form and are:

$$|\varphi\rangle_{A_k B_k} = 1/\sqrt{d} \sum_{j=0}^{d-1} |jj\rangle_{A_k B_k} \ (k=1,2,\ldots,P+1);$$

the P intermediate nodes make generalized Bell measurement on the two particles held by them respectively, to establish the entangled channel between the information sender Alice and the information receiver Bob;

the P intermediate nodes respectively consider the connection condition of classical channels with the information sender Alice and the information receiver Bob, and transmit respective generalized Bell measurement results to Alice or Bob according to actual condition, Alice or Bob determines the matrix transformation operation to be performed according to the respective measurement results they receive and adjusts the entangled channel, so that at this time, a direct entangled channel between the information sender Alice and the information receiver Bob can be established; and the multihop quantum teleportation system is simplified into a single-hop teleportation system form, to perform a single-hop quantum teleportation process, the information sender Alice performs a joint Bell measurement on the held particle t and particle $A_1$ and transmits her measurement result to the information receiver Bob, and Bob performs a corresponding unitary operation on his particle $B_{P+1}$ according to the received result to recover information of the transferred unknown quantum state.

In an embodiment, when "the P intermediate nodes respectively consider the connection condition of classical channels with the information sender Alice and the information receiver Bob, and transmit respective generalized Bell measurement results to Alice or Bob according to actual condition, Alice or Bob determines the matrix transformation operation to be performed according to the respective measurement results they receive and adjusts the entangled channel", an adjusted quantum channel system has the following form:

$$
\begin{aligned}
&|\varphi\rangle \\
&= \left(\frac{1}{\sqrt{d}}\right)^{P+1} \left(\frac{1}{\sqrt{d}}\right)^{P-1} \\
&\quad \sum_{m_1,n_1=0}^{d-1} \sum_{m_2,n_2=0}^{d-1} \cdots \sum_{m_P,n_P=0}^{d-1} |\Phi_{m_1 n_1}\rangle_{B_1 A_2} |\Phi_{m_2 n_2}\rangle_{B_2 A_3} \cdots |\Phi_{m_P n_P}\rangle_{B_P A_{P+1}} \\
&\quad U_{m_1 n_1}^{A_1/B_{P+1}} U_{m_2 n_2}^{A_1/B_{P+1}} \cdots U_{m_P n_P}^{A_1/B_{P+1}} |\Phi\rangle_{A_1 B_{P+1}} \\
&= \left(\frac{1}{\sqrt{d}}\right)^{P+1} \left(\frac{1}{\sqrt{d}}\right)^{P-1} \sum_{m_1,n_1=0}^{d-1} \sum_{m_2,n_2=0}^{d-1} \cdots \sum_{m_P,n_P=0}^{d-1} |\Phi_{m_1 n_1}\rangle_{B_1 A_2} |\Phi_{m_2 n_2}\rangle_{B_2 A_3} \cdots \\
&\quad |\Phi_{m_P n_P}\rangle_{B_P A_{P+1}} \left(\prod_{[a]} U_{m_a n_a}^{A_1}\right)\left(\prod_{[b]} U_{m_b n_b}^{B_{P+1}}\right)\left(\frac{1}{\sqrt{d}} \sum_{j=0}^{d-1} |jj\rangle_{A_1 B_{P+1}}\right)
\end{aligned}
$$

in the foregoing formula, $$|\Phi_{m_k n_k}\rangle_{B_k A_{k+1}} \ (k=1,2,\ldots,P)$$

represents the generalized Bell measurement result of the $k^{th}$ intermediate node Charlie k, and $$|\Phi_{m_k n_k}\rangle_{B_k A_{k+1}} = \frac{1}{\sqrt{d}} \sum_{j=0}^{d-1} e^{\frac{2\pi i}{d} j m_k} |j\rangle|j \oplus n_k\rangle (k = 1, 2, \ldots, P);$$

$$U_{m_k n_k}^{A_1/B_{P+1}} (k = 1, 2, \ldots, P)$$

represents that after measuring the held particles k and $B_k$ to obtain $A_{k+1}$, Charlie $$|\Phi_{m_k n_k}\rangle_{B_k A_{k+1}}$$

transmits the measurement result to Alice or Bob according to actual condition; it is assumed that $$(U_{A_1})^{-1} = \prod_{\{a\}} \left(U_{m_a n_a}^{A_1}\right)^{-1},$$

which corresponds to the unitary operation that Alice needs to perform on the particle $A_1$ after Alice summarizing the received measurement results, wherein $\{a\}$ is a set of sequence numbers of all intermediate nodes that have transmitted the measurement results to Alice; similarly, it is assumed that $$(U_{B_{P+1}})^{-1} = \prod_{\{b\}} \left(U_{m_b n_b}^{B_{P+1}}\right)^{-1},$$

which corresponds to a unitary operation that Bob needs to perform on the particle $B_{P+1}$ after Bob summarizing the received measurement results, wherein $\{b\}$ is a set of sequence numbers of all intermediate nodes that have transmitted the measurement results to Bob; and after performing the corresponding unitary operations, Alice and Bob can transform an entangled state of the particles $A_1$ and $B_{P+1}$ into a form of $$|\varphi\rangle_{A_1 B_{P+1}} = \frac{1}{\sqrt{t1}} \sum_{j=0}^{d-1} |jj\rangle_{A_1 B_{P+1}},$$

where $$U_{m_a n_a}^{A_1} \left(U_{m_a n_a}^{A_1}\right)^{-1} = I; \quad U_{m_b n_b}^{B_{P+1}} \left(U_{m_b n_b}^{B_{P+1}}\right)^{-1} = I.$$

In an embodiment, "the P intermediate nodes respectively consider the connection condition of classical channels with the information sender Alice and the information receiver Bob" includes whether classical information can be transmitted.

In an embodiment, "the P intermediate nodes respectively consider the connection condition of classical channels with the information sender Alice and the information receiver Bob" includes whether information communication is smooth.

In an embodiment, "the P intermediate nodes respectively consider the connection condition of classical channels with the information sender Alice and the information receiver Bob" includes transmission efficiency.

The beneficial effects of the present invention are as follows:

1. In the d-dimensional chain teleportation method for random transmission based on measurement results of relay nodes of the present invention, any relay node can randomly transmit its generalized Bell measurement result to the information sender Alice or the information receiver Bob, thereby greatly reducing connection restrictions of a classical channel.

2. In the present invention, measurement results of the relay nodes can be simultaneously transferred to the information sender Alice or the information receiver Bob. Therefore, the present invention improves the efficiency of information transmission.

3. The present invention is applied to a high-level entanglement chain channel. Even if the sender and the receiver do not directly share a quantum entangled pair, information of a quantum state can still be transmitted between the two parties, so that the requirement of constructing a complex quantum communication network can be satisfied.

BRIEF DESCRIPTION OF THE DRAWINGS

FIG. 5 is a schematic diagram of particle distribution of a 3-level 3-hop chain teleportation method according to Embodiment 2 of the present invention.

DETAILED DESCRIPTION OF THE PREFERRED EMBODIMENTS

Figure 1:
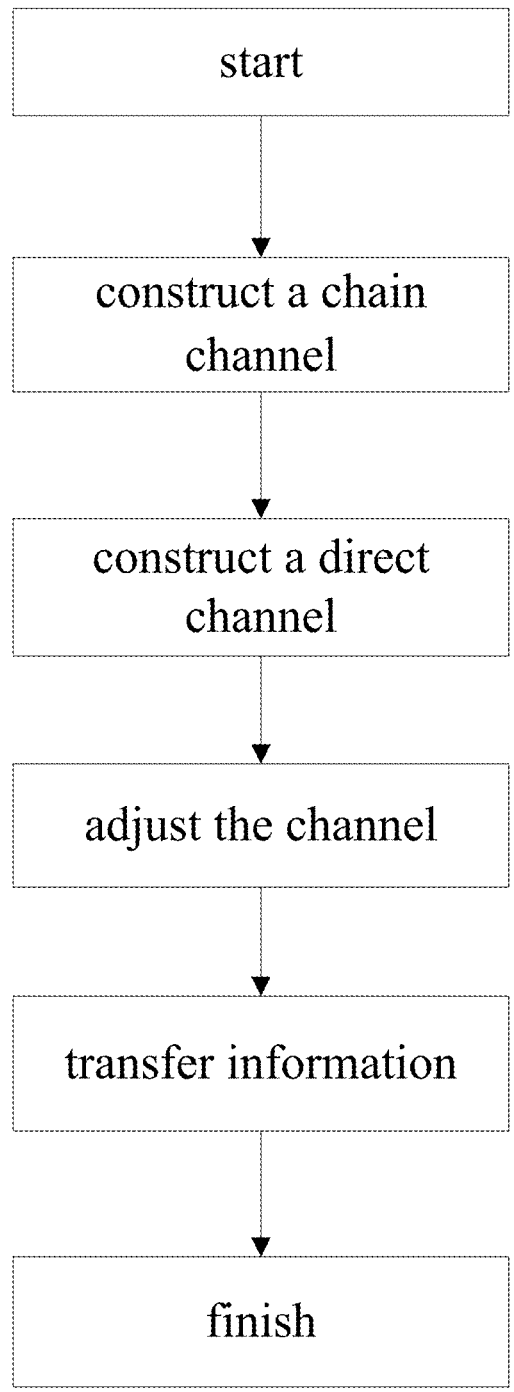
FIG. 1 is a flowchart of a d-dimensional chain teleportation method for random transmission based on measurement results of relay nodes according to the present invention.
Figure 2:
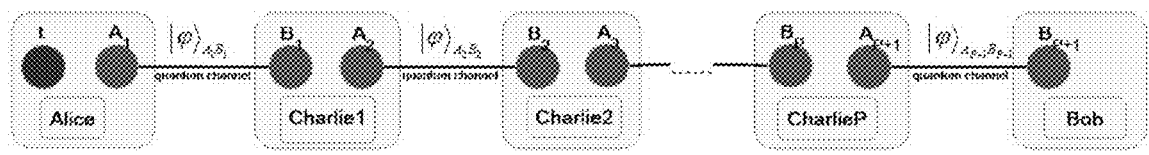
FIG. 2 is a particle distribution diagram of a d-dimensional chain teleportation method for random transmission based on measurement results of relay nodes according to the present invention.
Figure 3:
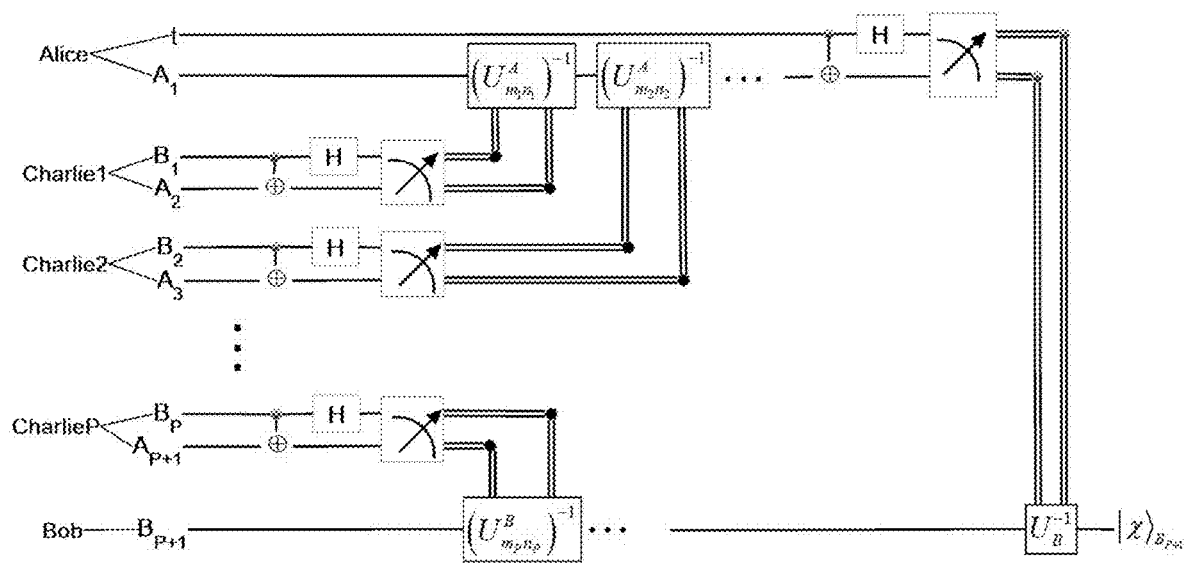
FIG. 3 is a schematic diagram in which the information sender Alice, the information receiver Bob, and the P intermediate nodes perform entanglement swapping to establish quantum channels according to the present invention.
Figure 4:
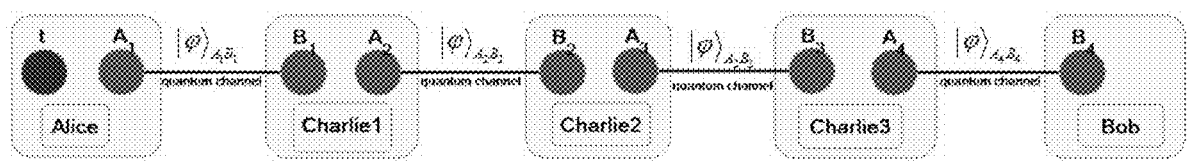
FIG. 4 is a schematic diagram of particle distribution of a 2-level 4-hop chain teleportation method according to Embodiment 1 of the present invention.

The present invention is further described below with reference to the accompanying drawings and specific embodiments, to enable a person skilled in the art to better understand and implement the present invention. However, the embodiments are not used to limit the present invention.

The technical terms of the present invention are described:

1. Generalized Bell Basis

The generalized Bell basis is a maximally entangled state formed by two multi-level particles, and forms a group of complete orthogonal bases in a d (the quantity of levels)-dimensional Hilbert space, the specific form is as follows:

$$|\psi_{rs}\rangle = \frac{1}{\sqrt{d}} \sum_{j=0}^{d-1} e^{\frac{2\pi i}{d} jr} |j\rangle|j \oplus s\rangle (r, s = 0, 1, 2, \ldots, d-1).$$

2. Operation of Unifying Forms of Entangled Channels

In the present invention, an entangled channel system of the information sender Alice and the information receiver Bob has the following form:

$$|\varphi\rangle = \left(\frac{1}{\sqrt{d}}\right)^{P+1}\left(\frac{1}{\sqrt{d}}\right)^{P-1} \sum_{m_1,n_1=0}^{d-1}\sum_{m_2,n_2=0}^{d-1}\cdots\sum_{m_P,n_P=0}^{d-1} |\Phi_{m_1n_1}\rangle_{B_1A_2}|\Phi_{m_2n_2}\rangle_{B_2A_3}\cdots|\Phi_{m_Pn_P}\rangle_{B_PA_{P+1}}$$

$$U_{m_1n_1}^{A_1/B_{P+1}} U_{m_2n_2}^{A_1/B_{P+1}} \cdots U_{m_Pn_P}^{A_1/B_{P+1}} |\Phi\rangle_{A_1B_{P+1}}$$

$$= \left(\frac{1}{\sqrt{d}}\right)^{P+1}\left(\frac{1}{\sqrt{d}}\right)^{P-1} \sum_{m_1,n_1=0}^{d-1}\sum_{m_2,n_2=0}^{d-1}\cdots\sum_{m_P,n_P=0}^{d-1} |\Phi_{m_1n_1}\rangle_{B_1A_2}|\Phi_{m_2n_2}\rangle_{B_2A_3}\cdots$$

$$|\Phi_{m_Pn_P}\rangle_{B_PA_{P+1}}\left(\prod_{\{a\}}U_{m_an_a}^{A_1}\right)\left(\prod_{\{b\}}U_{m_bn_b}^{B_{P+1}}\right)\left(\frac{1}{\sqrt{d}}\sum_{j=0}^{d-1}|jj\rangle_{A_1B_{P+1}}\right)$$

After a $k^{th}$ intermediate node Charlie k measures the held particles $B_k$ and $A_{k+1}$ to obtain $$|\Phi_{m_kn_k}\rangle_{B_kA_{k+1}} (k=1,2,\ldots,P),$$

if Charlie transmits his measurement result to Alice, Alice needs to perform an operation $$\left(U_{m_kn_k}^{A_1}\right)^{-1}$$

on the particle $A_1$. If Charlie transmits his measurement result to Bob, Bob needs to perform an operation $$\left(U_{m_kn_k}^{B_{P+1}}\right)^{-1}$$

on the particle $B_{P+1}$. After summing up all received measurement results, Alice and Bob respectively perform matrix transformations $$(U_{A_1})^{-1} = \prod_{\{a\}}\left(U_{m_an_a}^{A_1}\right)^{-1}$$

and $$(U_{B_{P+1}})^{-1} = \prod_{\{b\}}\left(U_{m_bn_b}^{B_{P+1}}\right)^{-1},$$

and respectively transform entangled states of the particles $A_1$ and $B_{P+1}$ into a unified form:

$$|\varphi\rangle_{A_1B_{P+1}} = \frac{1}{\sqrt{d}}\sum_{j=0}^{d-1}|jj\rangle_{A_1B_{P+1}}.$$

The related matrix expressions are as follows:

$$U_{m_an_a}^{A_1} = \sum_{j=0}^{d-1} e^{-\frac{2\pi i}{d}jm_a}|j\oplus n_a\rangle\langle j|$$

$$U_{m_bn_b}^{B_{P+1}} = \sum_{j=0}^{d-1} e^{-\frac{2\pi i}{d}jm_b}|j\rangle\langle j\oplus n_b|$$

$$\left(U_{m_an_a}^{A_1}\right)^{-1} = \sum_{j=0}^{d-1} e^{\frac{2\pi i}{d}jm_a}|j\rangle\langle j\oplus n_a|$$

$$\left(U_{m_bn_b}^{B_{P+1}}\right)^{-1} = \sum_{j=0}^{d-1} e^{\frac{2\pi i}{d}jm_b}|j\oplus n_b\rangle\langle j|.$$

In a d-level chain teleportation communication system, the information sender Alice and the information receiver Bob that do not directly share an entangled pair can generate a direct entangled state with the help of P intermediate nodes, to establish a quantum entangled channel, to complete the process that the information sender Alice transfers a single-particle multi-level unknown quantum state to the information receiver Bob. In this multihop teleportation system, the relay node can randomly transmit its generalized Bell measurement result to the information sender Alice or the information receiver Bob. This includes the following steps:

Step 1: Construct a chain channel. Two communicating parties are the information sender Alice and the information receiver Bob, and the particle t carries an unknown quantum state and is held by the information sender Alice, Alice holds the particle t and a particle $A_1$, the first intermediate node Charlie 1 holds a particle $B_1$ and a particle $A_2$, the second intermediate node Charlie 2 holds a particle $B_2$ and the particle $A_3, \ldots$, and a $k^{th}$ (k=1, 2, 3, ..., P) intermediate node Charlie k holds a particle $B_k$ and a particle $A_{k+1}$, where P is a positive integer, the information receiver Bob at the target node is a $(P+2)^{th}$ node in a multihop quantum teleportation system and holds the particle $B_{P+1}$, every two adjacent nodes share the two-bit Bell state quantum channel, to form the chain communication channel, and entangled channels have the same form and are:

$$|\varphi\rangle_{A_kB_k} = \frac{1}{\sqrt{d}}\sum_{j=0}^{d-1}|jj\rangle_{A_kB_k}(k=1,2,\ldots,P+1);$$

Step 2: Construct a direct channel. P intermediate nodes respectively perform generalized Bell measurements on respective held two particles. After the measurements are completed, in consideration of the connection condition of classical channels with the information sender Alice and the information receiver Bob (for example, whether classical information can be transmitted, whether information communication is smooth, and transmission efficiency), the P intermediate nodes select, according to actual condition, to transmit respective generalized Bell measurement results to Alice or Bob.

Step 3: Adjust the channel. Alice or Bob determines the matrix transformation operation to be performed according to the respective measurement results they receive and adjusts the entangled channel. An adjusted quantum channel system has the following form:

$$|\varphi\rangle = \left(\frac{1}{\sqrt{d}}\right)^{P+1} \left(\frac{1}{\sqrt{d}}\right)^{P-1} \sum_{m_1,n_1=0}^{d-1} \sum_{m_2,n_2=0}^{d-1} \cdots \sum_{m_P,n_P=0}^{d-1} |\Phi_{m_1 n_1}\rangle_{B_1 A_2} |\Phi_{m_2 n_2}\rangle_{B_2 A_3} \cdots$$

$$|\Phi_{m_P n_P}\rangle_{B_P A_{P+1}} U_{m_1 n_1}^{A_1/B_{P+1}} U_{m_2 n_2}^{A_1/B_{P+1}} \cdots U_{m_P n_P}^{A_1/B_{P+1}} |\Phi\rangle_{A_1 B_{P+1}}$$

$$= \left(\frac{1}{\sqrt{d}}\right)^{P+1} \left(\frac{1}{\sqrt{d}}\right)^{P-1} \sum_{m_1,n_1=0}^{d-1} \sum_{m_2,n_2=0}^{d-1} \cdots \sum_{m_P,n_P=0}^{d-1} |\Phi_{m_1 n_1}\rangle_{B_1 A_2} |\Phi_{m_2 n_2}\rangle_{B_2 A_3} \cdots$$

$$|\Phi_{m_P n_P}\rangle_{B_P A_{P+1}} \left(\prod_{\{a\}} U_{m_a n_a}^{A_1}\right) \left(\prod_{\{b\}} U_{m_b n_b}^{B_{P+1}}\right) \left(\frac{1}{\sqrt{d}} \sum_{j=0}^{d-1} |jj\rangle_{A_1 B_{P+1}}\right)$$

in the foregoing formula, $$|\Phi_{m_k n_k}\rangle_{B_k A_{k+1}} (k=1, 2, \ldots, P)$$

represents the generalized Bell measurement result of the $k^{th}$ intermediate node Charlie k, and $$|\Phi_{m_k n_k}\rangle_{B_k A_{k+1}} = \frac{1}{\sqrt{d}} \sum_{j=0}^{d-1} e^{\frac{2\pi i}{d} j m_k} |j\rangle |j \oplus n_k\rangle (k=1, 2, \ldots, P);$$

$$U_{m_k n_k}^{A_1/B_{P+1}} (k=1, 2, \ldots, P)$$

represents that after measuring the held particles k and $B_k$ to obtain $A_{k+1}$, Charlie $$|\Phi_{m_k n_k}\rangle_{B_k A_{k+1}}$$

transmits the measurement result to Alice or Bob according to actual condition (for example, whether classical information can be transmitted, whether information communication is smooth, and transmission efficiency); it is assumed that $$(U_{A_1})^{-1} = \prod_{\{a\}} \left(U_{m_a n_a}^{A_1}\right)^{-1},$$

which corresponds to a unitary operation that Alice needs to perform on the particle $A_1$ after Alice sums up received measurement results, where $\{a\}$ is a set of sequence numbers of all intermediate nodes that have transmitted a measurement result to Alice; similarly, it is assumed that $$(U_{B_{P+1}})^{-1} = \prod_{\{b\}} \left(U_{m_b n_b}^{B_{P+1}}\right)^{-1},$$

which corresponds to a unitary operation that Bob needs to perform on the particle $B_{P+1}$ after Bob sums up received measurement results, where $\{b\}$ is a set of sequence numbers of all intermediate nodes that have transmitted a measurement result to Bob.

After performing the corresponding unitary operations, Alice and Bob can transform an entangled state of the particles $A_1$ and $B_{P+1}$ into a form of $$|\varphi\rangle_{A_1 B_{P+1}} = \frac{1}{\sqrt{d}} \sum_{j=0}^{d-1} |jj\rangle_{A_1 B_{P+1}},$$

where $$U_{m_a n_a}^{A_1} \left(U_{m_a n_a}^{A_1}\right)^{-1} = I; U_{m_b n_b}^{B_{P+1}} \left(U_{m_b n_b}^{B_{P+1}}\right)^{-1} = I,$$

and $$U_{m_a n_a}^{A_1} = \sum_{j=0}^{d-1} e^{-\frac{2\pi i}{d} j m_a} |j \oplus n_a\rangle\langle j|$$

$$U_{m_b n_b}^{B_{P+1}} = \sum_{j=0}^{d-1} e^{-\frac{2\pi i}{d} j m_b} |j\rangle\langle j \oplus n_b|$$

$$\left(U_{m_a n_a}^{A_1}\right)^{-1} = \sum_{j=0}^{d-1} e^{\frac{2\pi i}{d} j m_a} |j\rangle\langle j \oplus n_a|$$

$$\left(U_{m_b n_b}^{B_{P+1}}\right)^{-1} = \sum_{j=0}^{d-1} e^{\frac{2\pi i}{d} j m_b} |j \oplus n_b\rangle\langle j|.$$

Here, a direct entangled channel in a d-dimensional multihop lossless quantum teleportation system can be obtained. The channel is formed by three parts: The first part is generalized Bell measurement results of the P intermediate nodes. The second part is a matrix transformation operation that should be performed to adjust the form of direct entangled states between a source node and the intermediate nodes corresponding to the measurement results. The third part is an entangled state of the particle $A_1$ of the information sender Alice and the particle $B_{P+1}$ of the information receiver Bob.

Step 4: Transfer information. The multihop teleportation system is simplified into a single-hop teleportation system form, to perform a single-hop lossless quantum teleportation process, the information sender Alice performs a joint Bell measurement on the held particle t and particle $A_1$, and Alice can obtain $d^2$ different measurement results:

$$|\Phi_{rs}\rangle_{t A_1} = \frac{1}{\sqrt{d}} \sum_{j=0}^{d-1} e^{\frac{2\pi i}{d} j r} |j\rangle |j \oplus s\rangle (r, s = 0, 1, \ldots, d-1).$$

Alice transmits her measurement result to the information receiver Bob, and Bob performs a corresponding unitary operation $$\left(U_{rs}^{B_{P+1}}\right)^{-1} = \sum_{j=0}^{d-1} e^{\frac{2\pi i}{d} j r} |j \oplus s\rangle\langle j|$$

on his particle $B_{P+1}$ according to the received result to restore information of the transferred unknown quantum state.

More specifically:

Embodiment 1: A d-dimensional chain teleportation method for random transmission based on measurement results of relay nodes is provided, and a 2-level 4-hop example is used to implement the transfer of an unknown single particle state $|\chi\rangle_t$ from the information sender Alice to the information receiver Bob. Specific steps are as follows:

Step 1: Construct a 2-level 4-hop quantum teleportation chain channel. Two communicating parties are Alice and Bob. The particle t carries an unknown quantum state $|\chi\rangle_t = c_0|0\rangle + c_1|1\rangle$ and is held by the information sender Alice. Alice wants to transmit the unknown single particle quantum state to the information receiver Bob by using three intermediate nodes. In a quantum path, entangled channels have the same form and are:

$$|\varphi\rangle_{A_k B_k} = \frac{1}{\sqrt{2}}(|00\rangle + |11\rangle)_{A_k B_k} (k = 1, 2, 3, 4).$$

Step 2: Construct a direct channel. Three intermediate nodes Charlie 1, Charlie 2, and Charlie 3 respectively perform generalized Bell measurements on respective held two particles. After the measurements are completed, in consideration of the connection condition of classical channels with the information sender Alice and the information receiver Bob (for example, whether classical information can be transmitted, and transmission efficiency), the P intermediate nodes select, according to actual condition, to transmit respective generalized Bell measurement results to Alice or Bob. A direct channel is constructed. Entanglement swapping is performed on every two of the information sender Alice used as the source node, three intermediate nodes, and the information receiver Bob used as a target node, to establish direct entanglement between Alice and Bob. A tensor product operation is performed on entangled channels $|\varphi\rangle_{A_1 B_1}$, $|\varphi\rangle_{A_2 B_2}$, $|\varphi\rangle_{A_3 B_3}$, and $|\varphi\rangle_{A_4 B_4}$, and quantum states of eight particles after the operation are represented as:

$$|\varphi\rangle = |\varphi\rangle_{A_1 B_1} \otimes |\varphi\rangle_{A_2 B_2} \otimes |\varphi\rangle_{A_3 B_3} \otimes |\varphi\rangle_{A_4 B_4}$$

$$\bigotimes_{k=1}^{4} \frac{1}{\sqrt{2}}(|00\rangle + |11\rangle)_{A_k B_k}$$

$$\left(\frac{1}{\sqrt{2}}\right)^4 \left(\frac{1}{\sqrt{2}}\right)^2 \sum_{m_1,n_1=0}^{1} \sum_{m_2,n_2=0}^{1} \sum_{m_3,n_3=0}^{1} |\Phi_{m_1 n_1}\rangle_{B_1 A_2} |\Phi_{m_2 n_2}\rangle_{B_2 A_3}$$

$$|\Phi_{m_3 n_3}\rangle_{B_3 A_4} U_{m_1 n_1}^{A_1/B_4} U_{m_2 n_2}^{A_1/B_4} U_{m_3 n_3}^{A_1/B_4} |\Phi\rangle_{A_1 B_4}$$

The three intermediate nodes Charlie 1, Charlie 2, and Charlie 3 respectively perform Bell measurements on respective held two particles, and each intermediate nod can obtain four measurement results:

$$|\Phi_{00}\rangle_{B_k A_{k+1}} = \frac{1}{\sqrt{2}}(|0\rangle|0\rangle + |1\rangle|1\rangle)_{B_k A_{k+1}}$$

$$|\Phi_{10}\rangle_{B_k A_{k+1}} = \frac{1}{\sqrt{2}}(|0\rangle|0\rangle - |1\rangle|1\rangle)_{B_k A_{k+1}}$$

$$|\Phi_{01}\rangle_{B_k A_{k+1}} = \frac{1}{\sqrt{2}}(|0\rangle|1\rangle + |1\rangle|0\rangle)_{B_k A_{k+1}}$$

$$|\Phi_{11}\rangle_{B_k A_{k+1}} = \frac{1}{\sqrt{2}}(|0\rangle|1\rangle - |1\rangle|0\rangle)_{B_k A_{k+1}}.$$

To carry out detailed research on an operation process, the following case is used as an example: The measurement result of the intermediate node Charlie 1 is $|\Phi_{01}\rangle_{B_1 A_2}$, and the measurement result is transmitted to Alice. Charlie 2 performs a measurement to obtain a result $|\Phi_{11}\rangle_{B_2 A_3}$, and transmits the measurement result to Alice. Charlie 3 performs a measurement to obtain a result $|\Phi_{10}\rangle_{B_3 A_4}$, and transmits the result to Bob. At this time, the quantum state of the system turns into:

$$|\varphi\rangle = \left(\frac{1}{\sqrt{2}}\right)^4 \left(\frac{1}{\sqrt{2}}\right)^2 |\Phi_{01}\rangle_{B_1 A_2} |\Phi_{11}\rangle_{B_2 A_3} |\Phi_{10}\rangle_{B_3 A_4} \frac{1}{\sqrt{2}}(-|00\rangle - |11\rangle)_{A_1 B_4}$$

$$= \left(\frac{1}{\sqrt{2}}\right)^4 \left(\frac{1}{\sqrt{2}}\right)^2 |\Phi_{01}\rangle_{B_1 A_2} |\Phi_{11}\rangle_{B_2 A_3} |\Phi_{10}\rangle_{B_3 A_4} (U_{01}^{A_1} U_{11}^{A_1})$$

$$(U_{10}^{B_4}) \frac{1}{\sqrt{2}}(|00\rangle + |11\rangle)_{A_1 B_4}.$$

Step 3: Adjust the channel. Alice performs a matrix transformation operation on the particle $A_1$: $(U_{A_1})^{-1} = (U_{11}^{A_1})^{-1}(U_{01}^{A_1})^{-1} = (|0\rangle\langle 1| - |1\rangle\langle 0|)(|0\rangle\langle 1| + |1\rangle\langle 0|) = |0\rangle\langle 0| - |1\rangle\langle 1|$, and Bob performs a matrix transformation operation: $(U_{B_4})^{-1} = (U_{10}^{B_4})^{-1} = |0\rangle\langle 0| - |1\rangle\langle 1|$, so that the form of the directly entangled state can turn into:

$$|\varphi\rangle_{A_1 B_4} = \frac{1}{\sqrt{2}}(|00\rangle + |11\rangle)_{A_1 B_4}.$$

Step 4: Transfer information. The multihop teleportation system is simplified into a single-hop teleportation system form, to perform a single-hop lossless quantum teleportation process, the information sender Alice transfers an unknown quantum state by using the direct entangled channel $$|\varphi\rangle_{A_1 B_4} = \frac{1}{\sqrt{2}}(|00\rangle + |11\rangle)_{A_1 B_4},$$

and the quantum teleportation process is simplified into the following form:

$$|\gamma\rangle = |\chi\rangle_t \otimes |\varphi\rangle_{A_1 B_4}$$

$$= (c_0|0\rangle + c_1|1\rangle)_t \otimes \frac{1}{\sqrt{2}}(|00\rangle + |11\rangle)_{A_1 B_4}$$

$$= \left(\frac{1}{\sqrt{2}}\right)^2 \begin{bmatrix} |\Phi_{00}\rangle_{t A_1}(c_0|0\rangle + c_1|1\rangle)_{B_4} + |\Phi_{10}\rangle_{t A_1}(c_0|0\rangle - c_1|1\rangle)_{B_4} + \\ |\Phi_{01}\rangle_{t A_1}(c_0|1\rangle + c_1|0\rangle)_{B_4} + |\Phi_{11}\rangle_{t A_1}(c_0|1\rangle - c_1|0\rangle)_{B_4} \end{bmatrix}.$$

In this case, Alice performs Bell measurements on her own particles t and $A_1$, four measurement results $|\Phi_{rs}\rangle_{tA_1}$ (r,s=0,1) can be obtained, and Bob performs a corresponding unitary operation $(U_{rs}^{B_4})^{-1} = \sum_{j=0}^{1} e^{\pi i \cdot jr} |j \oplus s\rangle\langle j|$ according to the measurement results to restore the transferred unknown quantum state.

Embodiment 2: A d-dimensional chain teleportation method for random transmission based on measurement results of relay nodes is provided, and a 3-level 3-hop example is used to implement the transfer of an unknown single particle state $|\chi\rangle_t$ from an information sender Alice to an information receiver Bob. Specific steps are as follows:

Step 1: Construct a 3-level 3-hop quantum teleportation chain channel. Two communicating parties are Alice and Bob. The particle t carries an unknown quantum state $|\chi\rangle_t = c_0|0\rangle + c_1|1\rangle + c_2|2\rangle$ and is held by the information sender Alice. Alice wants to transmit the unknown single particle quantum state to the information receiver Bob by using three intermediate nodes. In a quantum path, entangled channels have the same form and are:

$$|\varphi\rangle_{A_k B_k} = \frac{1}{\sqrt{3}}(|00\rangle + |11\rangle + |22\rangle)_{A_k B_k} \quad (k = 1, 2, 3).$$

Step 2: Construct a direct channel. Two intermediate nodes Charlie 1 and Charlie 2 respectively perform the generalized Bell measurements on respective held two particles. After the measurements are completed, in consideration of the connection condition of classical channels with the information sender Alice and the information receiver Bob (for example, whether classical information can be transmitted, and transmission efficiency), the P intermediate nodes select, according to actual condition, to transmit respective generalized Bell measurement results to Alice or Bob. A direct channel is constructed. Entanglement swapping is performed on every two of the information sender Alice used as the source node, three intermediate nodes, and the information receiver Bob used as a target node, to establish direct entanglement between Alice and Bob. A tensor product operation is performed on entangled channels $|\varphi\rangle_{A_1B_1}$, $|\varphi\rangle_{A_2B_2}$, and $|\varphi\rangle_{A_3B_3}$, and quantum states of six particles after the operation are represented as:

$$|\varphi\rangle = |\varphi\rangle_{A_1B_1} \otimes |\varphi\rangle_{A_2B_2} \otimes |\varphi\rangle_{A_3B_3}$$

$$= \bigotimes_{k=1}^{3} \frac{1}{\sqrt{3}}(|00\rangle + |11\rangle + |22\rangle)_{A_kB_k}$$

$$= \left(\frac{1}{\sqrt{3}}\right)^2 \frac{1}{\sqrt{3}} \sum_{m_1,n_1=0}^{2} \sum_{m_2,n_2=0}^{2} |\Phi_{m_1n_1}\rangle_{B_1A_2} |\Phi_{m_2n_2}\rangle_{B_2A_3} U_{m_1n_1}^{A_1/B_3} U_{m_2n_2}^{A_1/B_3}$$

$$|\Phi\rangle_{A_1B_3}.$$

The two intermediate nodes Charlie 1 and Charlie 2 respectively perform a generalized Bell measurement on respective held two particles, and each intermediate node can obtain nine measurement $$|\Phi_{m_k n_k}\rangle_{B_k, A_{k+1}} = \frac{1}{\sqrt{3}} \sum_{j=0}^{2} e^{\frac{2\pi i}{3} jm_k} |j\rangle\langle j \oplus n_k| \, (m_k, n_k = 0, 1, 2; \, k = 1, 2, 3).$$

To carry out detailed research on an operation process, the following case is used as an example: The measurement result of the intermediate node Charlie 1 is $|\Phi_{11}\rangle_{B_1A_2}$, and the measurement result is transmitted to Alice. Charlie 2 performs a measurement to obtain a result $|\Phi_{22}\rangle_{B_2A_3}$, and transmits the measurement result to Bob. At this time, the quantum state of the system turns into:

$$|\varphi\rangle = \left(\frac{1}{\sqrt{3}}\right)^2 \frac{1}{\sqrt{3}} |\Phi_{11}\rangle_{B_1A_2} |\Phi_{22}\rangle_{B_2A_3} \frac{1}{\sqrt{3}}\left(e^{-\frac{4\pi i}{3}}|22\rangle + e^{-\frac{4\pi i}{3}}|00\rangle\right) +$$

$$e^{-\frac{10\pi i}{3}}|11\rangle\Big)_{A_1B_3}$$

$$= \left(\frac{1}{\sqrt{3}}\right)^2 \frac{1}{\sqrt{3}} |\Phi_{11}\rangle_{B_1A_2} |\Phi_{22}\rangle_{B_2A_3} U_{11}^{A_1} U_{22}^{B_3} \frac{1}{\sqrt{3}}(|00\rangle + |11\rangle +$$

$$|22\rangle)_{A_1B_3}.$$

Step 3: Adjust the channel. Alice performs a matrix transformation operation on the particle $$A_1 : (U_{A_1})^{-1} = \left(U_{11}^{A_1}\right)^{-1} = |0\rangle\langle 1| + e^{\frac{2\pi i}{3}}|1\rangle\langle 2| + e^{\frac{4\pi i}{3}}|2\rangle\langle 0|,$$

and Bob performs a matrix transformation operation:

$$(U_{B_3})^{-1} = \left(U_{22}^{B_3}\right)^{-1} = |2\rangle\langle 0| + e^{\frac{4\pi i}{3}}|0\rangle\langle 1| + e^{\frac{8\pi i}{3}}|1\rangle\langle 2|,$$

so that the form of the directly entangled state can turn into:

$$|\varphi\rangle_{A_1B_3} = \frac{1}{\sqrt{3}}(|00\rangle + |11\rangle + |22\rangle)_{A_1B_3}.$$

Step 4: Transfer information. The multihop teleportation system is simplified into a single-hop teleportation system form, to perform a single-hop lossless quantum teleportation process, the information sender Alice transfers an unknown quantum state by using the direct entangled channel $$|\varphi\rangle_{A_1B_3} = \frac{1}{\sqrt{3}}(|00\rangle + |11\rangle + |22\rangle)_{A_1B_3},$$

and the quantum teleportation process is simplified into the following form:

$$|\gamma\rangle$$

$$= |\chi\rangle_t \otimes |\varphi\rangle_{A_1B_3}$$

$$= (c_0|0\rangle + c_1|1\rangle + c_2|2\rangle)_t \otimes \frac{1}{\sqrt{3}}(|00\rangle + |11\rangle + |22\rangle)_{A_1B_3}$$

-continued $$= \left(\frac{1}{\sqrt{3}}\right)^2 \begin{bmatrix} |\Phi_{00}\rangle_{tA_1}(c_0|0\rangle + c_1|1\rangle + c_2|2\rangle)_{B_3} + \\ |\Phi_{10}\rangle_{tA_1}\left(c_0|0\rangle + e^{-\frac{2\pi i}{3}}c_1|1\rangle + e^{-\frac{4\pi i}{3}}c_2|2\rangle\right)_{B_3} + \\ |\Phi_{20}\rangle_{tA_1}\left(c_0|0\rangle + e^{-\frac{4\pi i}{3}}c_1|1\rangle + e^{-\frac{8\pi i}{3}}c_2|2\rangle\right)_{B_3} + \\ |\Phi_{01}\rangle_{tA_1}(c_0|1\rangle + c_1|2\rangle + c_2|0\rangle)_{B_3} + \\ |\Phi_{11}\rangle_{tA_1}\left(c_0|1\rangle + e^{-\frac{2\pi i}{3}}c_1|2\rangle + e^{-\frac{4\pi i}{3}}c_2|0\rangle\right)_{B_3} + \\ |\Phi_{21}\rangle_{tA_1}\left(c_0|1\rangle + e^{-\frac{4\pi i}{3}}c_1|2\rangle + e^{-\frac{8\pi i}{3}}c_2|0\rangle\right)_{B_3} + \\ |\Phi_{02}\rangle_{tA_1}(c_0|2\rangle + c_1|0\rangle + c_2|1\rangle)_{B_3} + \\ |\Phi_{12}\rangle_{tA_1}\left(c_0|2\rangle + e^{-\frac{2\pi i}{3}}c_1|0\rangle + e^{-\frac{4\pi i}{3}}c_2|1\rangle\right)_{B_3} + \\ |\Phi_{22}\rangle_{tA_1}\left(c_0|2\rangle + e^{-\frac{4\pi i}{3}}c_1|0\rangle + e^{-\frac{8\pi i}{3}}c_2|1\rangle\right)_{B_3} \end{bmatrix}$$

In this case, Alice performs a Bell measurement on her own particles t and $A_1$, nine measurement results $|\Phi_{rs}\rangle_{tA_1}$ (r,s=0,1,2) can be obtained, and Bob performs a corresponding unitary operation $$\left(U_{rs}^{B_3}\right)^{-1} = \sum_{j=0}^{1} e^{\frac{2\pi i}{3}\cdot jr}|j\oplus s\rangle\langle j|$$

according to the measurement results to restore the transferred unknown quantum state. For example, it is assumed that Alice performs a measurement to obtain $|\Phi_{20}\rangle_{tA_1}$, and Bob performs a unitary operation on the particle $B_3$:

$$\left(U_{20}^{B_3}\right)^{-1} = \sum_{j=0}^{d-1} e^{\frac{2\pi i}{d}\cdot jr}|j\oplus s\rangle\langle j| = |0\rangle\langle 0| + e^{\frac{4\pi i}{3}}|1\rangle\langle 1| + e^{\frac{8\pi i}{3}}|2\rangle\langle 2|.$$

The information of the transferred unknown quantum state can be recovered.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A d-dimensional chain teleportation method for random transmission based on measurement results of relay nodes, wherein two communicating parties are an information sender Alice and an information receiver Bob, a particle t carries an unknown quantum state and is held by the information sender Alice, Alice holds the particle t and a particle $A_1$, a first intermediate node Charlie 1 holds a particle $B_1$ and a particle $A_2$, a second intermediate node Charlie 2 holds a particle $B_2$ and a particle $A_3$, ..., and a $k^{th}$ (k=1, 2, 3, ..., P) intermediate node Charlie k holds a particle $B_k$ and a particle $A_{k+1}$, wherein P is a positive integer, the information receiver Bob at a target node is a $(P+2)^{th}$ node in a multihop quantum teleportation system and holds a particle $B_{P+1}$, every two adjacent nodes share a two-bit Bell state quantum channel, to form a chain communication channel, and entangled channels have the same form and are:

$$|\varphi\rangle_{A_kB_k} = 1/\sqrt{d}\sum_{j=0}^{d-1}|jj\rangle_{A_kB_k} \ (k=1,2,\ldots,P+1);$$

P intermediate nodes make generalized Bell measurement on the two particles held by them respectively, to establish an entangled channel between the information sender Alice and the information receiver Bob;

the P intermediate nodes respectively consider the connection condition of classical channels with the information sender Alice and the information receiver Bob, and transmit respective generalized Bell measurement results to Alice or Bob according to actual condition, Alice or Bob determines a matrix transformation operation to be performed according to the respective measurement results they receive and adjusts the entangled channel, so that at this time, a direct entangled channel between the information sender Alice and the information receiver Bob can be established; and the multihop quantum teleportation system is simplified into a single-hop teleportation system form, to perform a single-hop quantum teleportation process, the information sender Alice performs a joint Bell measurement on the held particle t and particle $A_1$ and transmits her measurement result to the information receiver Bob, and Bob performs a corresponding unitary operation on his particle $B_{P+1}$ according to the received result to recover information of the transferred unknown quantum state.

2. The d-dimensional chain teleportation method for random transmission based on measurement results of relay nodes according to claim 1, wherein when "the P intermediate nodes respectively consider the connection condition of classical channels with the information sender Alice and the information receiver Bob, and transmit respective generalized Bell measurement results to Alice or Bob according to actual condition, Alice or Bob determines the matrix transformation operation to be performed according to the respective measurement results they receive and adjusts the entangled channel", an adjusted quantum channel system has the following form:

$$|\phi\rangle$$

$$= \left(\frac{1}{\sqrt{d}}\right)^{P+1}\left(\frac{1}{\sqrt{d}}\right)^{P-1}\sum_{m_1,n_1=0}^{d-1}\sum_{m_2,n_2=0}^{d-1}\cdots\sum_{m_P,n_P=0}^{d-1}|\Phi_{m_1n_1}\rangle_{B_1A_2}|\Phi_{m_2n_2}\rangle_{B_2A_3}\cdots$$

$$|\Phi_{m_Pn_P}\rangle_{B_PA_{P+1}}U_{m_1n_1}^{A_1/B_{P+1}}U_{m_2n_2}^{A_1/B_{P+1}}\cdots U_{m_Pn_P}^{A_1/B_{P+1}}|\Phi\rangle_{A_1B_{P+1}}$$

$$= \left(\frac{1}{\sqrt{d}}\right)^{P+1}\left(\frac{1}{\sqrt{d}}\right)^{P-1}\sum_{m_1,n_1=0}^{d-1}\sum_{m_2,n_2=0}^{d-1}\cdots\sum_{m_P,n_P=0}^{d-1}|\Phi_{m_1n_1}\rangle_{B_1A_2}|\Phi_{m_2n_2}\rangle_{B_2A_3}\cdots$$

$$|\Phi_{m_Pn_P}\rangle_{B_PA_{P+1}}\left(\prod_{[a]}U_{m_an_a}^{A_1}\right)\left(\prod_{[b]}U_{m_bn_b}^{B_{P+1}}\right)\left(\frac{1}{\sqrt{d}}\sum_{j=0}^{d-1}|jj\rangle_{A_1B_{P+1}}\right)$$

in the foregoing formula, $$|\Phi_{m_kn_k}\rangle_{B_kA_{k+1}}(k=1,2,\ldots,P)$$

represents the generalized Bell measurement result of the $k^{th}$ intermediate node Charlie K, and $$|\Phi_{m_k n_k}\rangle_{B_k A_{k+1}} = \frac{1}{\sqrt{d}} \sum_{j=0}^{d-1} e^{\frac{2\pi i}{d} j m_k} |j\rangle |j \oplus n_k\rangle (k = 1, 2, \ldots, P);$$

$$U_{m_k n_k}^{A_1/B_{P+1}} (k = 1, 2, \ldots, P)$$

represents that after measuring the held particles $B_k$ and $A_{k+1}$ to obtain $$|\Phi_{m_k n_k}\rangle_{B_k A_{k+1}},$$

Charlie k transmits the measurement result to Alice or Bob according to actual condition; it is assumed that $$(U_{A_1})^{-1} = \prod_{\{a\}} (U_{m_a n_a}^{A_1})^{-1},$$

which corresponds to a unitary operation that Alice needs to perform on the particle $A_1$ after Alice summarizing the received measurement results, wherein $\{a\}$ is a set of sequence numbers of all intermediate nodes that have transmitted the measurement results to Alice; similarly, it is assumed that $$(U_{B_{P+1}})^{-1} = \prod_{\{b\}} (U_{m_b n_b}^{B_{P+1}})^{-1},$$

which corresponds to a unitary operation that Bob needs to perform on the particle $B_{P+1}$ after Bob summarizing the received measurement results, wherein $\{b\}$ is a set of sequence numbers of all intermediate nodes that have transmitted the measurement results to Bob; and after performing the corresponding unitary operations, Alice and Bob can transform an entangled state of the particles $A_1$ and $B_{P+1}$ into the form of $$|\varphi\rangle_{A_1 B_{P+1}} = \frac{1}{\sqrt{d}} \sum_{j=0}^{d-1} |jj\rangle_{A_1 B_{P+1}},$$

wherein $$U_{m_a n_a}^{A_1} (U_{m_a n_a}^{A_1})^{-1} = I; \; U_{m_b n_b}^{B_{P+1}} (U_{m_b n_b}^{B_{P+1}})^{-1} = I.$$

3. The d-dimensional chain teleportation method for random transmission based on measurement results of relay nodes according to claim 1, wherein "the P intermediate nodes respectively consider the connection condition of classical channels with the information sender Alice and the information receiver Bob" comprises whether classical information can be transmitted.

4. The d-dimensional chain teleportation method for random transmission based on measurement results of relay nodes according to claim 1, wherein "the P intermediate nodes respectively consider the connection condition of classical channels with the information sender Alice and the information receiver Bob" comprises whether information communication is smooth.

5. The d-dimensional chain teleportation method for random transmission based on measurement results of relay nodes according to claim 1, wherein "the P intermediate nodes respectively consider the connection condition of classical channels with the information sender Alice and the information receiver Bob" comprises transmission efficiency.

\* \* \* \* \*